(12) United States Patent
Dykstra et al.

(10) Patent No.: US 10,858,927 B2
(45) Date of Patent: Dec. 8, 2020

(54) SYSTEMS AND METHODS FOR ESTIMATING FORCES ON A DRILL BIT

(71) Applicant: Halliburton Energy Services, Inc., Houston, TX (US)

(72) Inventors: Jason D. Dykstra, Spring, TX (US); Yuzhen Xue, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 732 days.

(21) Appl. No.: 15/107,333

(22) PCT Filed: Dec. 30, 2014

(86) PCT No.: PCT/US2014/072783
§ 371 (c)(1),
(2) Date: Jun. 22, 2016

(87) PCT Pub. No.: WO2016/108855
PCT Pub. Date: Jul. 7, 2016

(65) Prior Publication Data
US 2016/0362972 A1  Dec. 15, 2016

(51) Int. Cl.
*E21B 44/02* (2006.01)
*E21B 49/00* (2006.01)
(Continued)

(52) U.S. Cl.
CPC .............. *E21B 44/02* (2013.01); *E21B 4/02* (2013.01); *E21B 7/04* (2013.01); *E21B 17/003* (2013.01);
(Continued)

(58) Field of Classification Search
CPC ... E21B 44/02; E21B 4/02; E21B 7/04; E21B 17/003; E21B 47/00; E21B 47/0006;
(Continued)

(56) References Cited

U.S. PATENT DOCUMENTS 5,124,626 A * 6/1992 Thoen .................. G05B 13/024
  318/609
5,678,643 A * 10/1997 Robbins .................... E21B 7/04
  166/255.2

(Continued)

OTHER PUBLICATIONS

"International Application Serial No. PCT/US2014/072783, International Search Report dated Sep. 23, 2015", 3 pgs.
"International Application Serial No. PCT/US2014/072783, Written Opinion dated Sep. 23, 2015", 9 pgs.

*Primary Examiner* — Alexander Satanovsky
*Assistant Examiner* — Douglas Kay

(57) ABSTRACT

Disclosed embodiments include systems and methods for estimating real-time bit forces experienced on a drill bit and decoupling bit force disturbances. Real-time bit forces can be estimated based on bit force observers using measurements from downhole sensor subs. Model-based observers that adopted to estimate the bit force from downhole sensor sub measurements. Strain and torque measurements as measured by the sensor subs are used to estimate bit force and bit torque. These measurements can be observed using an effective observer design with the estimated bit force and bit torque based on sensor sub measurements to track the real bit force and bit torque. Observations of estimated bit forces and identified bit force disturbances can be used perform drilling dynamics modeling and identify the occurrence of negative drilling events.

20 Claims, 10 Drawing Sheets

(51) Int. Cl.
    *E21B 47/007* (2012.01)
    *G01L 3/02* (2006.01)
    *E21B 4/02* (2006.01)
    *E21B 7/04* (2006.01)
    *E21B 17/00* (2006.01)
    *E21B 47/00* (2012.01)
    *E21B 47/024* (2006.01)
    *E21B 47/12* (2012.01)
    *E21B 47/18* (2012.01)

(52) U.S. Cl.
    CPC ............ *E21B 47/00* (2013.01); *E21B 47/007* (2020.05); *E21B 47/024* (2013.01); *E21B 47/12* (2013.01); *E21B 47/18* (2013.01); *E21B 49/003* (2013.01); *E21B 49/006* (2013.01); *G01L 3/02* (2013.01)

(58) Field of Classification Search
    CPC ........ E21B 47/024; E21B 47/12; E21B 47/18; E21B 49/003; E21B 49/006; G01L 3/02
    USPC ............................................................ 702/9
    See application file for complete search history.

(56) References Cited

U.S. PATENT DOCUMENTS

| | | | |
|---|---|---|---|
| 7,917,322 B2* | 3/2011 | Borgstadt | G01F 1/007 324/306 |
| 9,995,643 B2* | 6/2018 | McVay | E21B 44/00 |
| 2003/0168257 A1* | 9/2003 | Aldred | E21B 44/00 175/24 |
| 2003/0195733 A1* | 10/2003 | Huang | E21B 10/16 703/10 |
| 2009/0000823 A1* | 1/2009 | Pirovolou | E21B 7/04 175/61 |
| 2009/0250208 A1* | 10/2009 | Ramakrishnan | E21B 47/0005 166/250.02 |
| 2010/0314173 A1 | 12/2010 | Hbaieb et al. | |
| 2010/0319992 A1 | 12/2010 | Trinh et al. | |
| 2011/0060527 A1 | 3/2011 | Teodorescu | |
| 2012/0179428 A1* | 7/2012 | Dykstra | E21B 43/04 703/1 |
| 2014/0012506 A1 | 1/2014 | Adsit | |
| 2015/0300151 A1* | 10/2015 | Mohaghegh | E21B 41/0007 702/9 |
| 2017/0235007 A1* | 8/2017 | Holtz | E21B 44/00 175/24 |

* cited by examiner

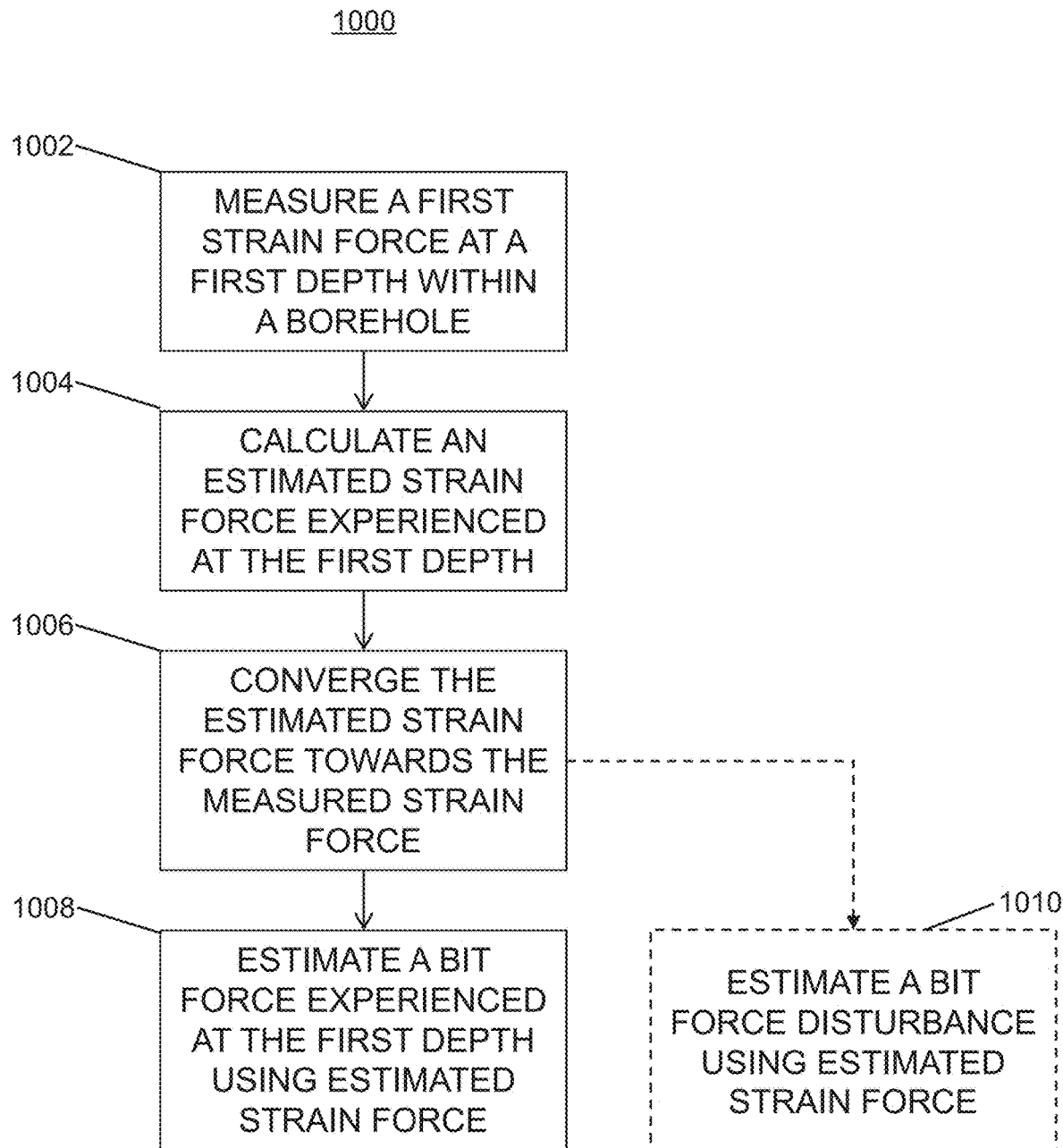

SYSTEMS AND METHODS FOR ESTIMATING FORCES ON A DRILL BIT

PRIORITY APPLICATION

This application is a U.S. National Stage Filing under 35 U.S.C. 371 from International Application No. PCT/US2014/072783, filed on Dec. 30, 2014, which application is incorporated herein by reference in its entirety.

BACKGROUND

The present disclosure relates to measuring while drilling techniques and, more particularly, to systems and methods for estimating bit force and hit force disturbances based on downhole measurements.

To obtain hydrocarbons such as oil and gas, boreholes are drilled by rotating a drill bit attached at a drill string end. A proportion of the current drilling activity involves directional drilling (e.g., drilling deviated and/or horizontal boreholes) to steer a well towards a target zone and increase hydrocarbon production from subterranean formations. Modern directional drilling systems generally employ a drill string having a bottom-hole assembly (BHA) and a drill bit situated at an end thereof that may be rotated by rotating the drill string from the surface, using a mud motor arranged downhole near the drill bit, or a combination of the mud motor and rotation of the drill string from the surface.

The BHA generally includes a number of downhole devices placed in close proximity to the drill bit and configured to measure certain downhole operating parameters associated with the drill string and drill bit. Such devices typically include sensors for measuring downhole temperature and pressure, azimuth and inclination measuring devices, and a resistivity measuring device to determine the presence of hydrocarbons and water. Additional downhole instruments, known as logging-while-drilling ("LWD") and measuring-while-drilling ("MWD") tools, are frequently attached to the drill string to determine the formation geology and formation fluid conditions during the drilling operations.

Boreholes are usually drilled along predetermined paths and the drilling of a typical borehole proceeds through various formations. To optimize drilling operations, a drilling operator at the surface controls the certain drilling parameters, such as weight on bit, bit force, bit torque, drilling fluid flow through the drill pipe, drill string rotational speeds, etc. The downhole operating conditions continually change and the drilling operator must be able to react to such changes and adjust the surface-controlled parameters to optimize the drilling operations for improving steering control effectiveness and to detect the unexpected drilling events such as damaging bit vibration, bit wear, and rock mechanics change for increasing the accuracy of controlling well trajectories.

BRIEF DESCRIPTION OF THE DRAWINGS

FIG. 10 is a flowchart of a method for operating an estimated system to estimate bit forces in drilling operations, according to one or more embodiments of the present disclosure.

DETAILED DESCRIPTION

The following detailed description refers to the accompanying drawings that depict various details of examples selected to show how particular embodiments may be implemented. The discussion herein addresses various examples of the inventive subject matter at least partially in reference to these drawings and describes the depicted embodiments in sufficient detail to enable those skilled in the art to practice the invention. Many other embodiments may be utilized for practicing the inventive subject matter than the illustrative examples discussed herein, and many structural and operational changes in addition to the alternatives specifically discussed herein may be made without departing from the scope of the inventive subject matter.

The present disclosure relates to measuring while drilling techniques and, more particularly, to methods and systems for estimating the real-time bit force and decoupling the bit force disturbance. The embodiments disclosed herein provide methods for real-time bit force estimation based on bit force observers using measurements from downhole sensor subs. Real-time bit force estimation enables accurate drilling dynamics modeling, including formation modeling and bit wear modeling. With the proposed observers, the negative impacts of unexpected events in drilling, such as damaging bit vibration, bit force disturbance, bit wear, rock mechanics change, can be effectively reduced. As will be appreciated, this would improve a steering controller's response time and stability, leading to improved steering control. The disclosed methods can also evolve into the basis for an automated drilling platform. By taking the burden of maintaining drilling parameters in appropriate ranges off of the driller and directional driller, more time is left for human analysis of the data and better judgment based upon better data.

The present disclosure provides model-based observers for estimating the bit force from downhole sensor sub measurements. In a control context, an observer is an algorithm, usually designed based on a system's model, to estimate non-measurable variables from the system's available measurements. The precondition for the existence of a valid observer is that the system is observable. That is, all states of the system, of current time or any past time, can be estimated given the current and past outputs/measurements.

Figure 1:
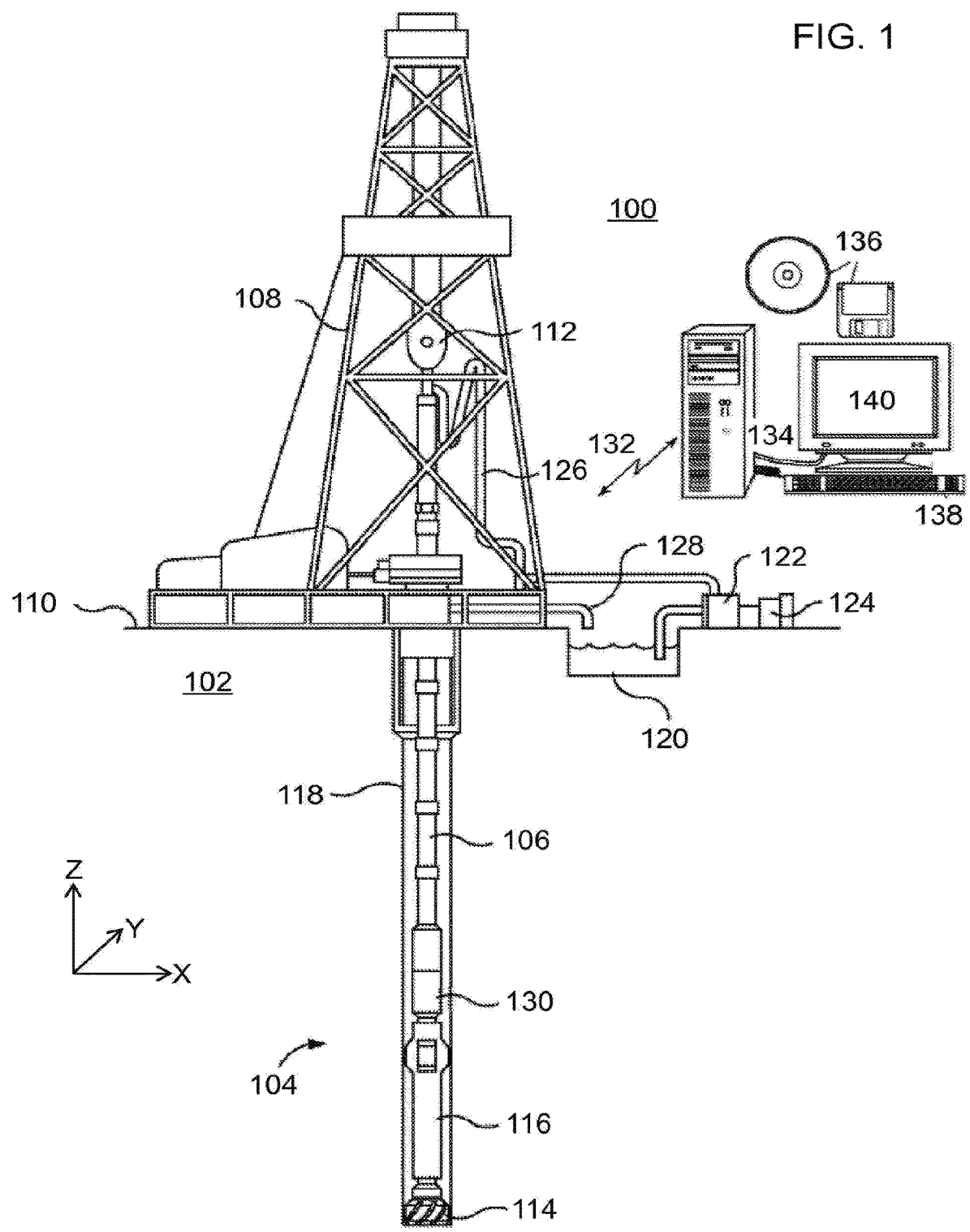
FIG. 1 is a schematic diagram of an example drilling system, according to one or more embodiments of the present disclosure.

FIG. 1 illustrates an example drilling system 100 that can be used in concert with one or more embodiments of the present disclosure. Boreholes are created by drilling into the earth 102 using the drilling system 100. The drilling system 100 drives a bottom hole assembly (BHA) 104 positioned at the bottom of a drill string 106 extending into the earth 102 from a derrick 108 arranged at the surface 110. The derrick 108 includes a kelly 112 used to lower and raise the drill string 106.

The BHA 104 includes a drill bit 114 and a tool string 116 which is moveable axially within a drilled wellbore 118 as attached to the drill string 106. During operation, the drill bit 114 is provided with sufficient weight on bit (WOB) and torque on bit (TOB) to penetrate the earth 102 and thereby create the wellbore 118. The BHA 104 also provides directional control of the drill bit 114 as it advances into the earth 102. The tool string 116 can be semi-permanently mounted with various measurement tools (not shown) such as, but not limited to, measurement-while-drilling (MWD) and logging-while-drilling (LWD) tools, that are configured to take downhole measurements of drilling conditions. In other embodiments, the measurement tools are self-contained within the tool string 116, as shown in FIG. 1.

Drilling fluid or "mud" from a mud tank 120 is pumped downhole using a mud pump 122 powered by an adjacent power source, such as a prime mover or motor 124. The mud is pumped from the mud tank 120, through a stand pipe 126, which feeds the mud into the drill string 106 and conveys the some to the drill bit 114. The mud exits one or more nozzles arranged in the drill bit 114 and in the process cools the drill bit 114. After exiting from the drill bit 114, the mud circulates back to the surface 110 via the annulus defined between the wellbore 118 and the drill string 106, and in the process returns drill cuttings and debris, such as sand and shale, to the surface. The cuttings and mud mixture are passed through a flow line 128 and into a shaker and optional centrifuge (not shown), which separates the majority of solids, such as cuttings and fines, from the mud, and returns the cleaned mud down hole through stand pipe 126 once again. Changes to various drilling parameters, such as change in rate of penetration (ROP) into the earth 102, can be observed, analyzed, and accounted for during this process.

A telemetry sub 130 coupled to the BHA transmits telemetry data to the surface via mud pulse telemetry. A transmitter in the telemetry sub 130 modulates a resistance to drilling fluid flow to generate pressure pulses that propagate along the fluid stream at the speed of sound to the surface. One or more pressure transducers convert the pressure signal into electrical signal(s) for a signal digitizer. Note that other forms of telemetry exist and may be used to communicate signals from downhole to the digitizer. Such telemetry may employ acoustic telemetry, electromagnetic telemetry, or telemetry via wired drillpipe.

A digital form of the telemetry signals is supplied via a communications link 132 to a processing unit 134 or some other form of a data processing device. In some examples, the processing unit 134 (which may be a conventional "computer" such as illustrated in FIG. 1 or in any of a variety of known forms) provides a suitable user interface and can provide and control storage and retrieval of data. In many examples, the processing unit 134 will include one or more processors in combination with additional hardware as needed (volatile and/or non-volatile memory; communication ports; I/O device(s) and ports; etc.) to provide the control functionality as described herein. An example processing unit 134 can serve to control the functions of the drilling system 100 and to receive and process downhole measurements transmitted from the telemetry sub 130 to control drilling parameters. In such examples, one or more a non-volatile, machine-readable storage devices 136 (i.e., a memory device (such as DRAM, FLASH, SRAM, or any other form of storage device; which in all cases shall be considered a non-transitory storage medium), a hard drive, or other mechanical, electronic, magnetic, or optical storage mechanism, etc.) will contain instructions suitable to cause the processor to describe the desired functionality, such as the various examples discussed herein). The processing unit 134 operates in accordance with software (which may be stored on non-volatile, machine-readable storage devices 136) and user input via an input device 138 to process and decode the received signals. The resulting telemetry data may be further analyzed and processed by the processing unit 134 to generate a display of useful information on a computer monitor 140 or some other form of a display device. Of course, these functions may be implemented by separate processing units, as desired, and additional functions may be performed by such one or more processing units in response to similarly stored instructions.

For purposes of illustration, the example of FIG. 1 shows a vertically-oriented borehole configuration. However, the systems and techniques described herein can also be used in other borehole configurations, such as a borehole including a horizontal penetration direction, or an oblique borehole configuration, for example. Although the drilling system 100 is shown and described with respect to a rotary drill system in PG. 1, those skilled in the art will readily appreciate that many types of drilling systems can be employed in carrying out embodiments of the disclosure. For instance, drills and drill rigs used in embodiments of the disclosure may be used onshore (e.g., as depicted in FIG. 1) or in offshore environments as well, such as for subsea operations (not shown). In particular, offshore or subsea operations may include use of the MWD/LWD drilling apparatus and techniques including aspects of the examples herein. Offshore oil rigs that may be used in accordance with embodiments of the disclosure include, for example, floaters, fixed platforms, gravity-based structures, drill ships, semi-submersible platforms, jack-up drilling rigs, tension-leg platforms, and the like. It will be appreciated that embodiments of the disclosure can be applied to rigs ranging anywhere from small in size and portable, to bulky and permanent.

Further, although described herein with respect to oil drilling, various embodiments of the disclosure may be used in many other applications. For example, disclosed methods can be used in drilling for mineral exploration, environmental investigation, natural gas extraction, underground installation, mining operations, water wells, geothermal wells, and the like.

Figure 2:
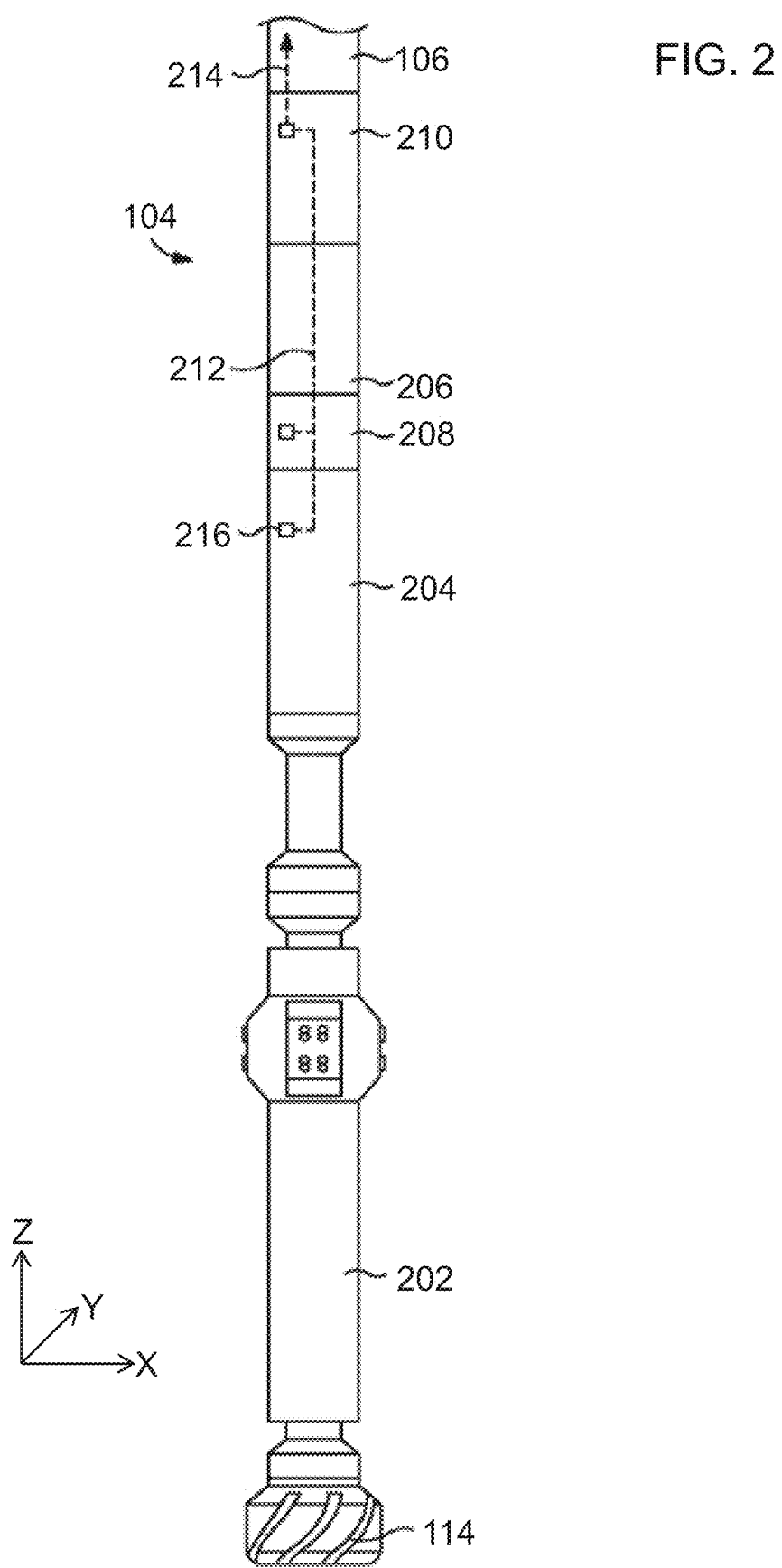
FIG. 2 is a schematic diagram of an example bottom-hole assembly, according to one or more embodiments of the present disclosure.

With continued reference to FIG. 1, FIG. 2 illustrates an example bottom-hole assembly (BHA) 104 that can be employed in concert with one or more embodiments of the present disclosure. Although described throughout with respect to a BHA, the embodiments described herein can be alternatively or additionally applied at multiple locations throughout a drill string, and are therefore not limited to the generalized location of a conventional BHA (i.e., bottom of a drill string). As shown, the BHA 104 includes the drill bit 114, a rotary steerable tool 202, an MWD/LWD tool 204, and a drill collar 206.

The MWD/LWD tool 204 further includes an MWD sensor package having one or more sensors 216 of an appropriate configuration to collect and transmit one or more of: directional information, mechanical information, formation information, and the like. In particular, the one or more sensors 216 include one or more internal or external sensors such as, but not limited to, an inclinometer, one or more magnetometers (i.e., compass units) or other azimuthal sensor, one or more accelerometers (or other vibration sensor), a shaft position sensor, an acoustic sensor, as well as other forms of sensors (such as various forms of formation sensors), as well as combinations of the above. The distance between the sensors 216 and the drill bit 114 can be any axial length required for the particular wellbore application. Directional information (e.g., wellbore trajectory in three-dimensional space) of the BHA 104 within the earth 102 (FIG. 1), such as inclination and azimuth, can be obtained in real-time using the sensors 216.

The MWD/LWD tool 204 can further include a formation sensor package that includes one or more sensors configured to measure formation parameters such as resistivity, porosity, sonic propagation velocity, or gamma ray transmissibility. In some embodiments, the MWD and LWD tools, and their related sensor packages, are in communication with one another to share collected data. The MWD/LWD tool 204 can be battery driven or generator driven, as known in the art, and any measurements obtained from the MWD/LWD tool 204 can be processed at the surface 110 (FIG. 1) and/or at a downhole location.

The drill collar 206 adds weight to the BHA 104 above the drill bit 114 so that there is sufficient weight on the drill bit 114 to drill through the requisite geological formations. In other embodiments, weight is also applied to the drill bit 114 through the drill string 106 as extended from the surface 110. Weight may be added or removed to/from the drill bit 114 during operation in order to optimize drilling performance and efficiency. For example, the curvature of the borehole can be predicted and the weight applied to the drill bit 114 optimized in order to take into account drag forces or friction caused by the curvature. As will be appreciated, increased amounts of drag forces will be present where the borehole curvature is more dramatic.

The BHA 104 further includes a sensor sub 208 coupled to or otherwise forming part of the BHA 104. The sensor sub 208 monitors various operational parameters in the downhole environment with respect to the BHA 104. For instance, the sensor sub 208 can be configured to monitor operational parameters of the drill bit 114 such as, but not limited to, weight-on-bit (WOB), torque-on-bit (TOB), rotations per minute (RPM) of the drill bit 114, bending moment of the drill string 106, vibration potentially affecting the drill bit 114, and the like. As illustrated, the sensor sub 208 is positioned uphole from the MWD/LWD tool 204 and the drill collar 206. In other embodiments, however, the sensor sub 208 can be positioned at any location along the BHA 104 without departing from the scope of the disclosure.

In some embodiments, the sensor sub 208 can be configured to provide real-time measurements of weight, torque and bending on an adjacent cutting tool (e.g., the drill bit 114) and/or drill string 106 to characterize the transfer of energy from the surface to the cutting tool and/or drill string 106. For example, the sensor sub 208 may be a MWD tool placed inside the drill collar 206 to provide the real-time measurements of tension, torsion, bending, and vibration at the drill collar 206. The strain and torque measurements from the sensor sub 208 are used to estimate the bit force and torque. As will be appreciated, these measurements help optimize drilling parameters to maximize performance and minimize wasted energy transfer and vibration.

The BHA 104 further includes a bi-directional communications module 210 coupled to or otherwise forming part of the drill string 106. The communications module 210 can be communicably coupled to each of the sensor sub 208 and the MWD/LWD tool 204 (e.g., its sensor(s) 216) via one or more communication lines 212 such that the communications module 210 sends and receives data to/from the sensor sub 208 and the MWD/LWD tool 204 in real time.

The communications module 210 can further be communicably coupled to the surface (not shown) via one or more communication lines 214 such that the communications module 210 sends and receives data in real time to/from the surface 110 (e.g., from FIG. 1) during operation. For instance, the communications module 210 communicates to the surface 110 various downhole operational parameter data as acquired via the sensor sub 208 and the MWD/LWD tool 204. In other embodiments, however, the communications module 210 communicates with a computerized system (not shown) or the like configured to receive the various downhole operational parameter data as acquired through the sensor sub 208 and the MWD/LWD tool 204. As will be appreciated, such a computerized system arranged either downhole or at the surface 110.

The communication lines 212, 214 can be any type of wired telecommunications devices or means known to those skilled in the art such as, but not limited to, electric wires or lines, fiber optic lines, etc. For instance, in some embodiments, a wired drill pipe (not shown) is used for two-way data transmission between the surface 110 and the communications module 210. Using a wired drill pipe, the BHA 104 and the drill string 106 have electrical wires built in to one or more of their components such that measurements and signals from the MWD/LWD tool 204 and the sensor sub 208 are carried directly to the surface 110 at high data transmission rates. As will be appreciated, signal wires can be incorporated into wirelines, coiled tubing, or slicklines, as known in the art, to directly transmit signals to the surface 110 for consideration. Alternatively or additionally, the communications module 210 includes or otherwise comprises a telemetry module used to transmit measurements to the surface 110 wirelessly, if desired, using one or more downhole telemetry techniques including, but not limited to, mud pulse, acoustic, electromagnetic frequency, combinations thereof, and the like.

In drilling practice, the bit reactive force should be monitored in real time. During drill path steering, the bit force direction indicates a steering direction. Accurate estimation of the bit force enables effective control by which the drilling follows the correct path with reduced tortuosity. An estimation of bit force disturbance facilitates decoupling the physical state feedback, and improves control system stabilities and reaction speeds. Further, because bit force disturbance relates to rock mechanics, damaging bit vibrations, and bit wear, bit reactive forces can be used to sense rock types, stick-slip and modify the bit wear model accordingly. This type of real-time fault detection (and also reaction) allows for improved assessment of formation mechanical properties encountered downhole to inform better decisions regarding drilling parameters (e.g., drilling speed, bit changes, bit torque, weight on the bit, etc.) for reducing drilling loss and/or improving drilling efficiency.

According to the present disclosure, strain and torque measurements as measured by the sensor sub 208 are used to estimate bit force and bit torque. These measurements can be observed using an effective observer design with the estimated bit force and bit torque based on sensor sub 208 measurements to track the real bit force and bit torque accurately and quickly. Applications of such embodiments ultimately increase steering control by improving steering controller's response time and stability, thus optimizing drilling operations. The observer design described herein decomposes the dynamics of the BHA 104 into the X, Y, and Z directions, as well as including a torsional direction. In each direction of the X, Y, and Z axes, the BHA 104 dynamics is described herein using a 3-mass BHA model.

Figure 3:
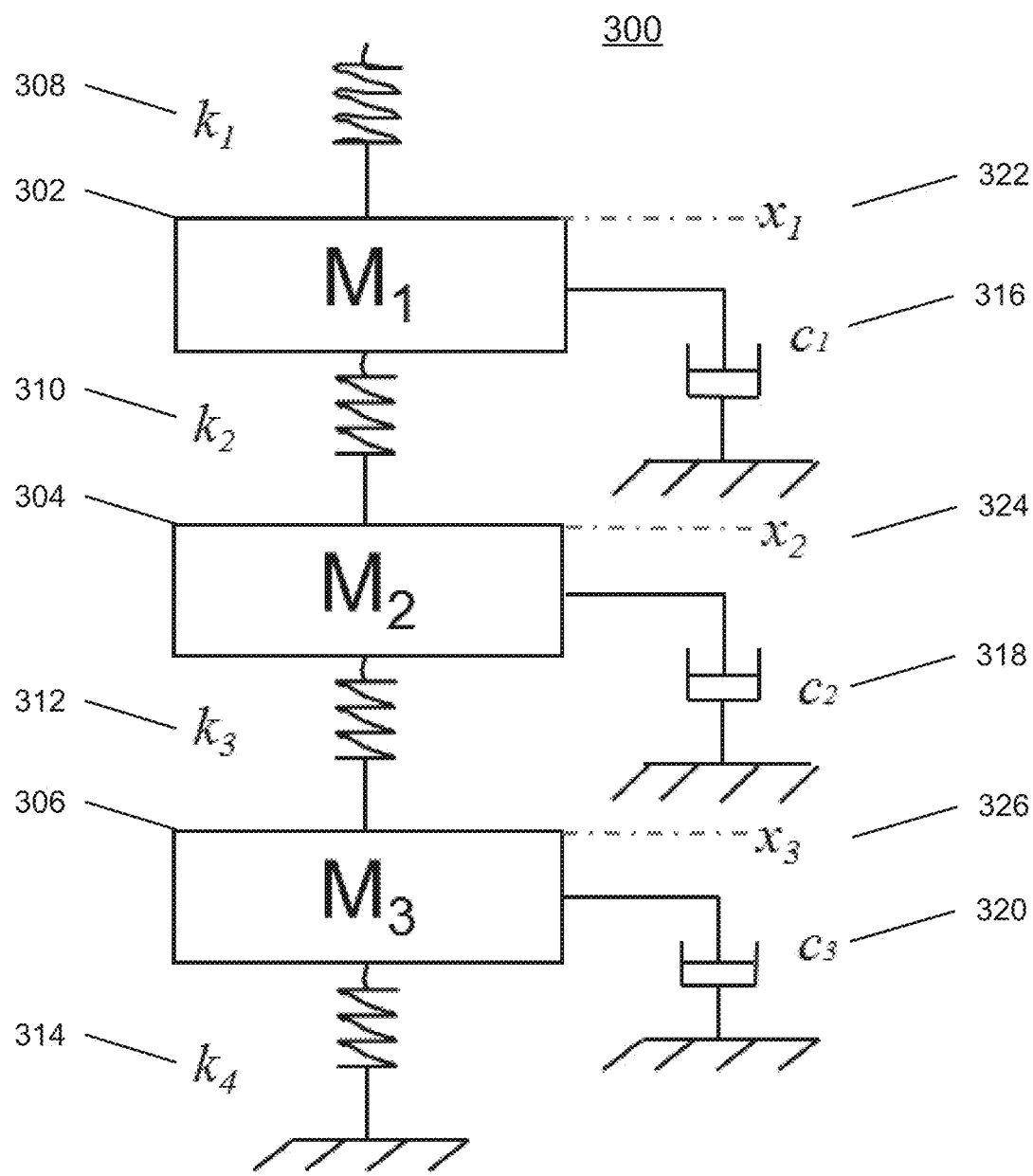
FIG. 3 is a schematic diagram of a three-mass model, according to one or more embodiments of the present disclosure.

For example, FIG. 3 shows an example BHA dynamics model. Here the BHA 104 is represented by the linear BHA dynamics model 300. Although in reality the BHA dynamics are nonlinear, they can be approximated by a linear system with adaptively updated parameters via real-time system identification techniques, wherein the parameters are updated when the model residues exceeds a predefined threshold. In the BHA dynamics model 300, from top down, the three masses 302, 304, and 306 (e.g., $M_1$, $M_2$, and $M_3$, respectively) represent different masses of three BHA sections. In particular, mass 302 represents mass in X-axis direction of the drill collar, mass 304 represents mass of the pipe between the collar and the bit, and mass 306 represents mass of the drill bit. The three masses 302, 304, and 306 are modeled as interacting with each other through springs and dampers of a mass spring damper (MSD) system. The spring coefficients 308, 310, 312, and 314 (e.g., $k_1$, $k_2$, $k_3$, and $k_4$, given in units of newtons per meter) and damping coefficients 316, 318, and 320 (e.g., $c_1$, $c_2$, and $c_3$, given in units of newton-seconds per meter) are derived from two factors. The first factor includes tension, bending interaction among the three BHA sections (e.g., masses 302, 304, and 306). The second factor includes the friction force between the BHA and the borehole wall. The states 322, 324, and 326 (e.g., $x_1$, $x_2$, and $x_3$) in the 3-mass BHA dynamics model 300 denote mass positions. Using the BHA dynamics model 300, $k_4 x_3$ corresponds to the bit force/force on bit and $k_2*(x_1-x_2)$ corresponds to the force oriented from the strain as measured by, for example, the sensor sub 208. In other words, the force $k_2*(x_1-x_2)$ is calculated by the difference between mass state 322 (e.g., $x_1$) and mass state 324 (e.g., $x_2$) (i.e., strain $x_1-x_2$, times the spring constant $k_2$).

Figure 4:
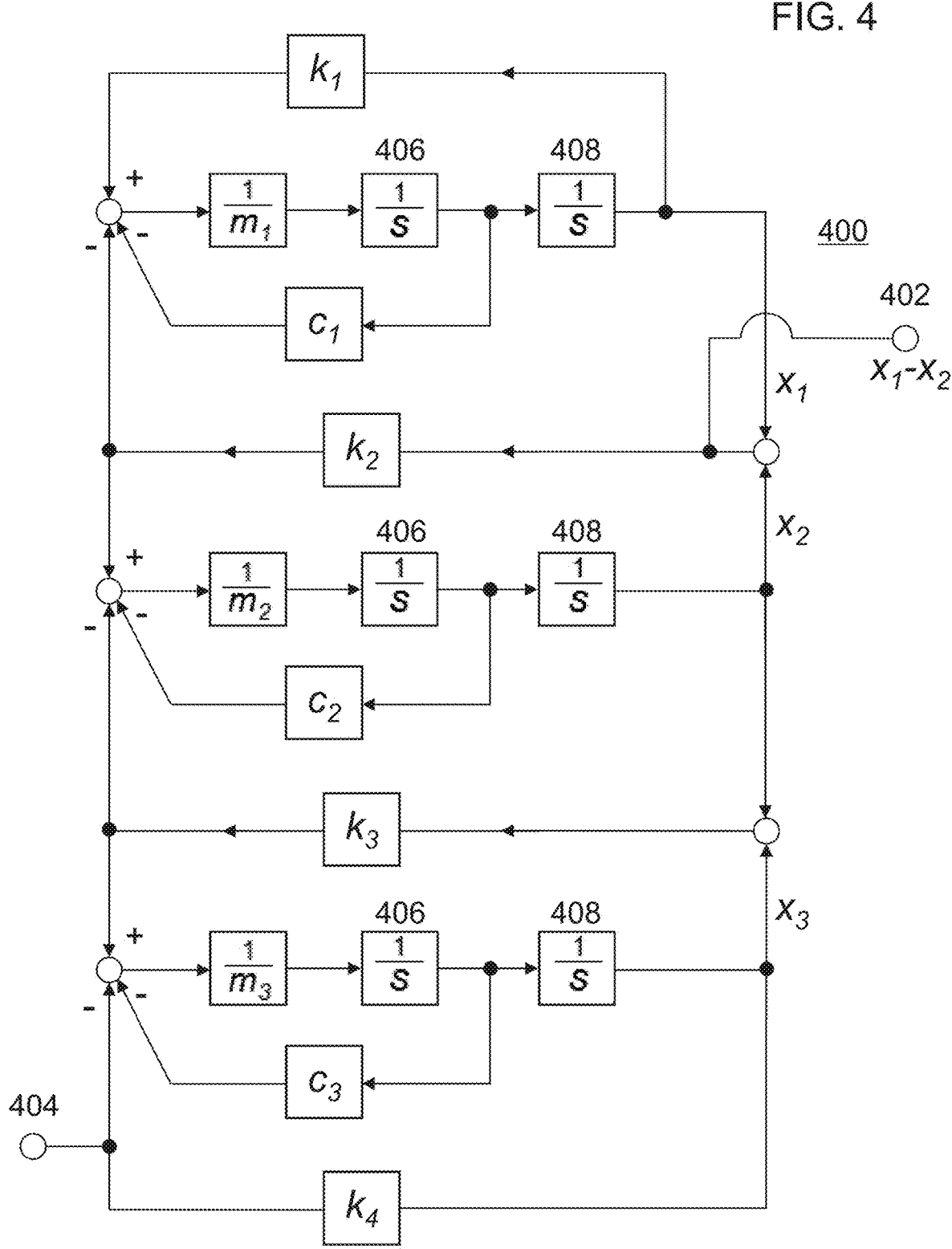
FIG. 4 is a schematic diagram of a real BHA dynamics system based on the three-mass model.

With continued reference to FIG. 3, FIG. 4 illustrates an example schematic diagram 400 based on the above-identified 3-mass BHA dynamics model. The schematic diagram 400 corresponds to the model as shown in FIG. 3, where a disturbance (e.g., representing a component of the change of bit reactive force along the X direction) is added to the bit force. In schematic diagram 400, $m_1$, $m_2$, and $m_3$ correspond to the three masses 302, 304, and 306 of the 3-mass BHA dynamics model in FIG. 3 (e.g., $M_1$, $M_2$, and $M_3$, respectively, representing different masses of three BHA sections). Further, $k_1$, $k_2$, $k_3$, and $k_4$ correspond to the spring coefficients 308, 310, 312, and 314 of the 3-mass BHA dynamics model in FIG. 3; and $c_1$, $c_2$, and $c_3$ correspond to the damping coefficients 316, 318, and 320 of the 3-mass BHA dynamics model in FIG. 3. In the schematic diagram, two integrator blocks (e.g., 1/s) 406 and 408 are included next to each of the mass accelerations, $1/m_1$, $1/m_2$, and $1/m_3$ (e.g., according to the relationship where Force=Mass*Acceleration, and rearranged, Acceleration=Force/Mass). For each mass acceleration, a first integrator 406 integrates the mass acceleration to give its velocity, and the second integrator 408 integrates again (e.g., the output from the first integrator/velocity) to give the displacement of the respective mass. In this schematic diagram 400 of the BHA dynamics model, $x_1-x_2$ corresponds to a measured strain 402 and is correlated to a real force on bit 404.

Although the discussion here only discusses the model in the X direction for designing the corresponding observers, the models in other directions (e.g., Y and Z directions) are of similar form and the observers can be designed similarly.

The model represents BHA dynamics that can be updated in real-time. One of ordinary skill in the art will recognize that the system as illustrated in 3-mass BHA dynamics model 300 is observable. That is, the bit force can be estimated by observing $x_1-x_2$. Although the following observer discussions are based on a 3-mass model in the X-axis direction, the observer can be extended to all directions. In other embodiments, the BHA dynamics can be modeled by using mass models with N-number of masses (e.g., N-number greater than the 3 masses used to model in FIG. 3), with each N-mass model describing the dynamics in each direction. As the N-mass system is still observable, the observers from the 3-mass model discussed herein can be extended to the N-mass models.

Figure 5:
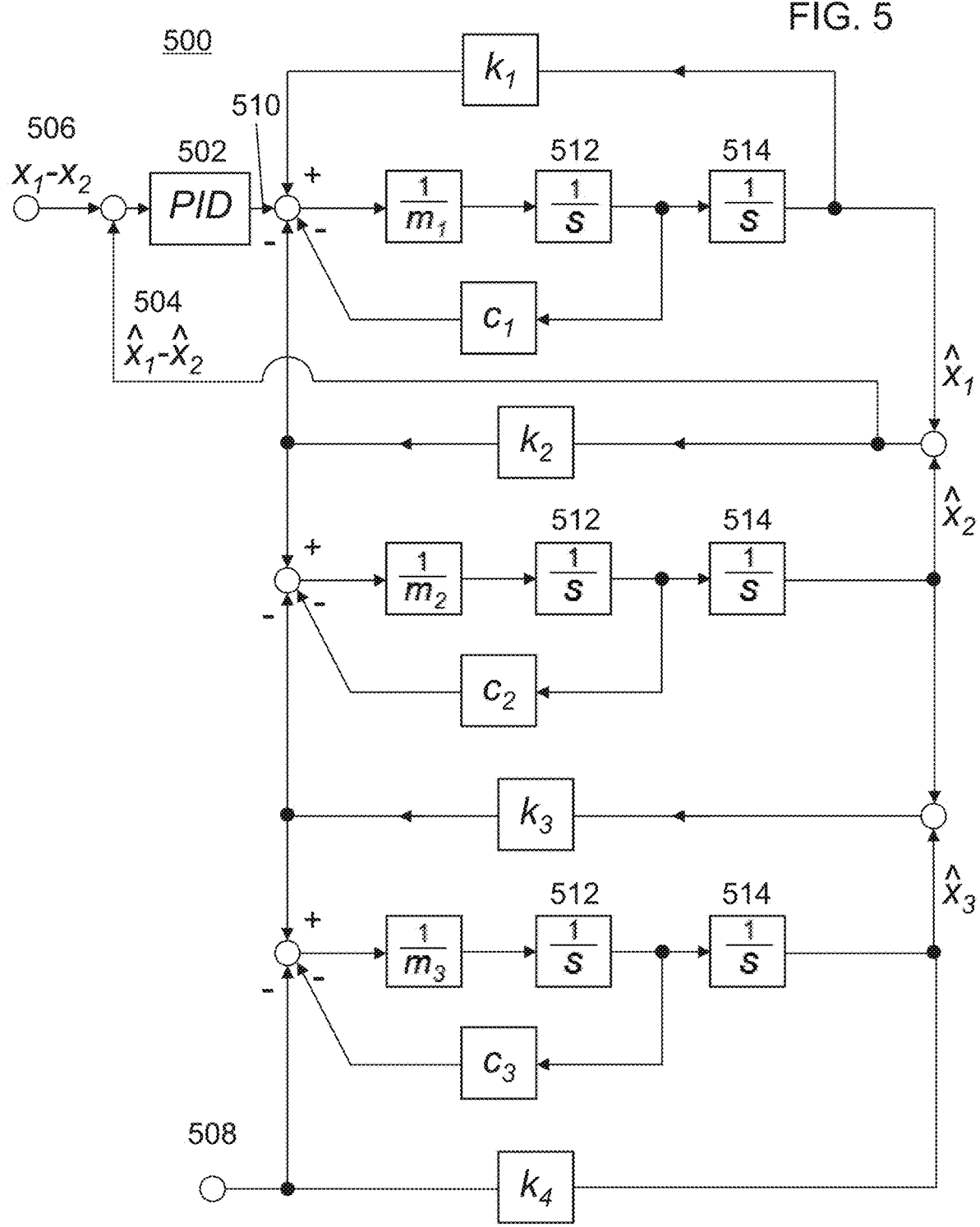
FIG. 5 is a schematic diagram of an observer for estimating BHA dynamics based on the three-mass model, according to one embodiment of the present disclosure.

With continued reference to FIGS. 3-4, FIG. 5 illustrates an example observer 500 for an estimated system based on the above-identified 3-mass BHA dynamics model 300 and schematic diagram 400. The schematic diagram of the BHA dynamics model is included in the observer 500, except that the real states (e.g., states 322, 324, and 326 corresponding to $x_1$, $x_2$, and $x_3$) of the BHA dynamics model 300 are replaced by the estimated states, $\hat{x}$, to model the dynamics of the estimated system. In observer 500, $m_1$, $m_2$, and $m_3$ correspond to the three masses 302, 304, and 306 of the 3-mass BHA dynamics model in FIG. 3 (e.g., $M_1$, $M_2$, and $M_3$, respectively, representing different masses of three BHA sections). Further, $k_1$, $k_2$, $k_3$, and $k_4$ correspond to the spring coefficients 308, 310, 312, and 314 of the 3-mass BHA dynamics model in FIG. 3. $c_1$, $c_2$, and $c_3$ correspond to the damping coefficients 316, 318, and 320 of the 3-mass BHA dynamics model in FIG. 3. In the schematic diagram of observer 500, two integrator blocks (e.g., 1/s) 512 and 514 are included next to each of the mass accelerations, $1/m_1$, $1/m_2$, and $1/m_3$ (e.g., according to the relationship where Force=Mass*Acceleration, and rearranged, Acceleration=Force/Mass). For each mass acceleration, a first integrator 512 integrates the mass acceleration to give its velocity, and the second integrator 514 integrates again (e.g., the output from the first integrator/velocity) to give the displacement of the respective mass. The observer 500 further includes a proportional-integral-derivative (PID) controller 502 as part of the observer design. PID controllers calculate an error value as the difference between a measured parameter of a process variable and a desired setpoint value to minimize the error by adjusting the process through the use of a manipulated variable.

In this example, the PID controller 502 outputs a force to the estimated system by using a process variable 504 (e.g., the estimated strain of $\hat{x}_1-\hat{x}_2$) relative to a setpoint 506 (e.g., the measured strain of $x_1-x_2$) to determine an error (e.g., the difference) between the process variable and the setpoint. The PID controller 502 uses the error, the integration of the error, and the rate of change of the error with an appropriate gain (e.g., reducing a feedback loop gain to achieve a gradual convergence to the desired strain) for updating the estimated system's dynamics.

The PID controller 502 outputs the force so that a difference (e.g., the error) between the measured strain 506, $x_1-x_2$ (e.g., from the sensor sub 208), and the estimated strain 504, $\hat{x}_1-\hat{x}_2$ (e.g., from the model of the estimated system), is driven to zero as closely and soon as possible. Thus, an estimated force on bit 508 can replicate the real force on bit experienced downhole. Once the error is driven towards zero, the estimated system dynamics output 510 approximates the real system's dynamics as measured.

The observer 500 is simple in design, wherein only the parameters in the PID controller 502 need to be tuned (e.g., the three-separate constant parameters: the (P)roportional, the (I)ntegral, and the (D)erivative values, denoted P, I, and D). These parameters can be interpreted in terms of time, wherein P depends on a present error, I on the accumulation of past errors (e.g., integration of the errors), and D is a prediction of future errors, based on a current rate of change of the error.

The proportional parameter depends only on the difference between the set point and the process variable. This difference is referred to as the error. A proportional gain of the PID controller 502, $K_c$ (not shown), determines a ratio of output relative to the error signal. For example purposes only, if the error has a magnitude of 10, a proportional gain of 5 would produce a proportional response of 50. In general, increasing the proportional gain will increase the speed of the control system response. However, if the proportional gain is too large, the process variable will begin to oscillate. If $K_c$ is increased further, the oscillations will become larger and the system will become unstable and may even oscillate out of control.

The integral parameter sums the error over time. The result is that even a small error term will cause the integral parameter to increase slowly. The integral response continually increases over time unless the error is zero, so the effect is to determine the steady-state error towards zero. Steady-state error represents a final difference between the process variable and the setpoint. A phenomenon called integral windup results when integral action saturates a PID controller without the PID controller determining the error signal toward zero.

The derivative parameter causes the output 510 of the PID controller 502 to decrease if the process variable is increasing rapidly. The derivative response is proportional to the rate of change of the process variable. Increasing a derivative time parameter, $T_d$ (not shown), will cause the control system to react more strongly to changes in the error and increases the speed of the overall control system response. Many control systems use very small derivative time ($T_d$), because the derivative response is highly sensitive to noise in the process variable signal. If the sensor feedback signal is noisy or if the control loop rate is too slow, the derivative response can make the control system unstable.

Tuning refers to the process of setting the optimal gains for P, I, and D to get a desired response from the PID controller 502. The tuning is performed for the system to be closed-loop stable and with good transient performance. In one example tuning method, the gains of the PID controller 502 can be obtained by trial and error, wherein the integral (I) and derivative (D) parameters are first set to zero and the proportional gain ($K_c$) is increased until the output of the loop oscillates. As the proportional gain increases, the system becomes faster, but care must be taken not make the system unstable. Once the proportional parameter has been set to obtain a desired fast response, the integral parameter is increased to stop the oscillations. The integral parameter reduces the steady state error, but increases overshoot. Some amount of overshoot is often necessary for a fast system so that it can respond to changes quickly. The integral parameter is adjusted to achieve a minimal steady state error. Once the P and I have been set to get a desired fast control system with minimal steady state error, the derivative parameter is increased until the loop is acceptably quick to its setpoint. Increasing the derivative parameter decreases overshoot and yields higher gain with stability but causes the system to become more sensitive to noise.

After being tuned according to a user's specifications, the PID controller 502 is capable of determining the difference between the estimated and the measured strain, and thus the difference between the two systems' dynamics, towards zero quickly. With observer 500, once the output 510 of the PID controller 502 is settled to a steady state, the bit force can be estimated accurately. Further, the output 510 of the PID controller 502 converges to an additive force/torque disturbance on bit.

When there is no bit force disturbance, the output 510 of the PID controller 502 converges towards zero as the input (e.g., difference between the measured strain 506 and the estimated strain 504) converges towards zero. However, in the presence of bit force disturbances, the output 510 of the PID controller 502 approaches a value of bit force disturbance to reduce the difference between the real and estimated strains. Thus, the output 510 of the PID controller 502 can be used to estimate the bit force disturbance. In other words, the output 510 of the PID controller 502 approximates the bit force disturbance. The bit force disturbance compensation provided by the approximated bit force disturbances can be used in the control system to reduce limit cycling, which is the repeated motion around the desired path without convergence in observer-based, PID-controlled systems, such as provided herein.

Although the discussions provided herein describes the error/difference between the measured strain and the estimated strain as being driven to zero, one of ordinary skill in the art will recognize that while the effect of PID control systems is to theoretically determine a steady-state error towards zero, an absolute zero error is not a requirement. Instead, the steady-state error (e.g., final difference between the process variable and the setpoint) often settles at a value that is slightly offset from the desired final value of zero error. For example, a certain percentage of error can be present between the process variable and the setpoint (e.g., between the measured strain 506 and the estimated strain 504). The estimated system can satisfactorily estimate force on bit at errors at above zero.

Figure 6A:
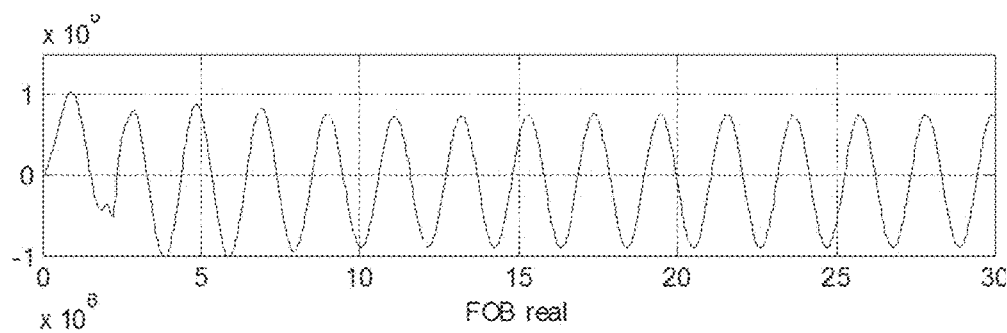
FIGS. 6A-6E are example response plots of an observer, according to one or more embodiments of the present disclosure.
Figure 6B:
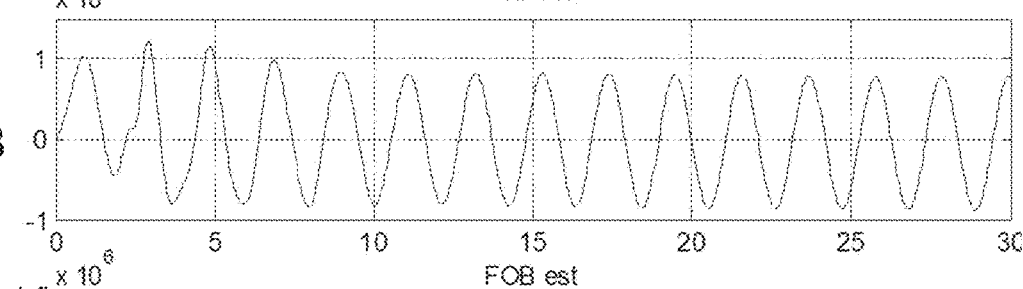
Figure 6C:
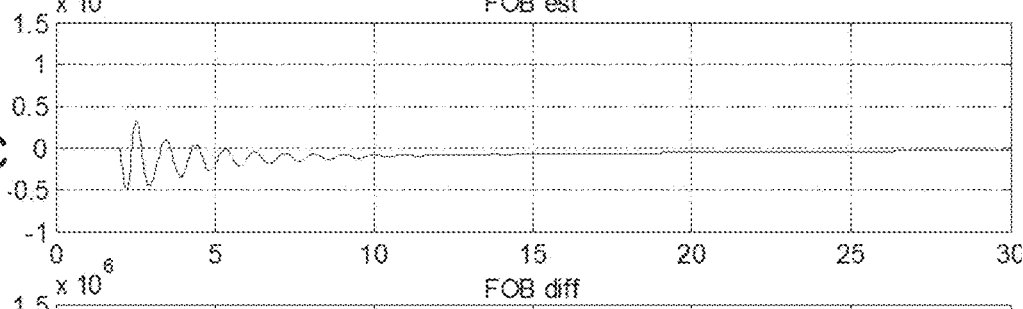
Figure 6D:
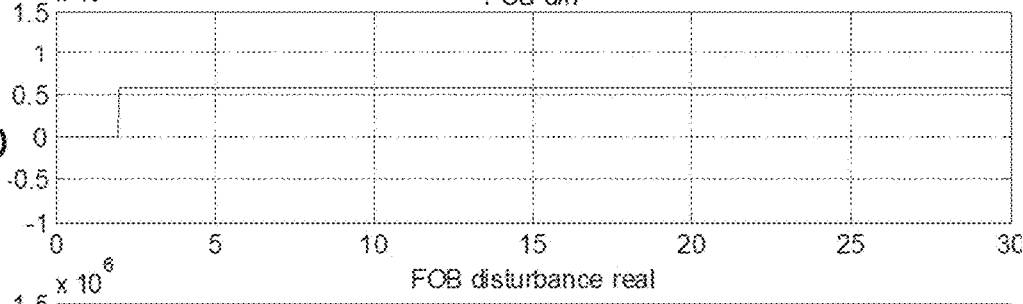
Figure 6E:
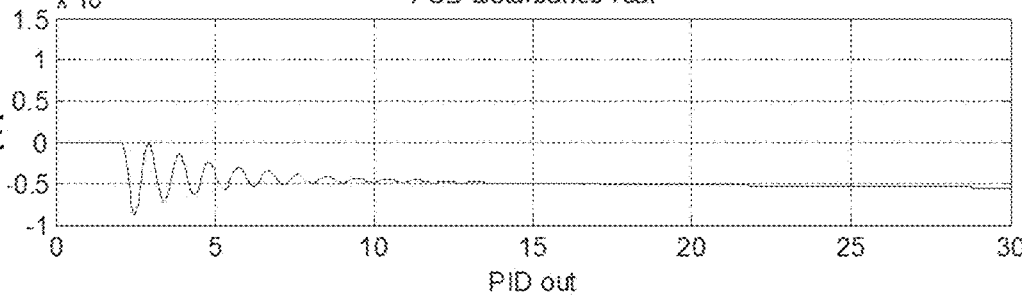

FIGS. 6A-6E illustrate example response plots of the observer 500 discussed above. As previously discussed, the BHA dynamics in the X-axis direction is estimated based on the BHA model 400 of FIG. 4, with a bit force disturbance added to the BHA estimation. The observer 500 of FIG. 5 is built using the same parameter set as in the BHA model 400. FIGS. 6A and 6B illustrate the real and estimated forces on bit, respectively, by estimating the bit force from the strain $x_1-x_2$ using observer 500. FIG. 6C illustrates the difference between the real and estimated bit forces, or in other words, illustrates a plot of the error. The real force on bit (FOB) oscillates about approximately 0.5 Hz, with an amplitude being on the order of $10^6$. A bit force disturbance is added to the FOB at approximately 2 seconds, with a value of $0.55*10^6$, as shown in FIG. 6D. It can be seen in FIG. 6C that the PID-integrated observer can accurately and quickly (e.g., within approximately 10 seconds) track the simulated BHA bit force when the system is subject to the additive FOB disturbance. It is noted that after the bit force disturbance is added at approximately the 2 second mark, the response plot shows in FIG. 6C that a settling time of approximately 10 seconds occurs for the system to overcome the effects of the introduced bit force disturbance and reduce the error towards a steady-state error value. FIG. 6E illustrates a plot of the PID output, which also tracks the bit force disturbance accurately and quickly (e.g., within 10 seconds). It is noted that the PID output and the FOB disturbance have opposite signs.

Figure 7:
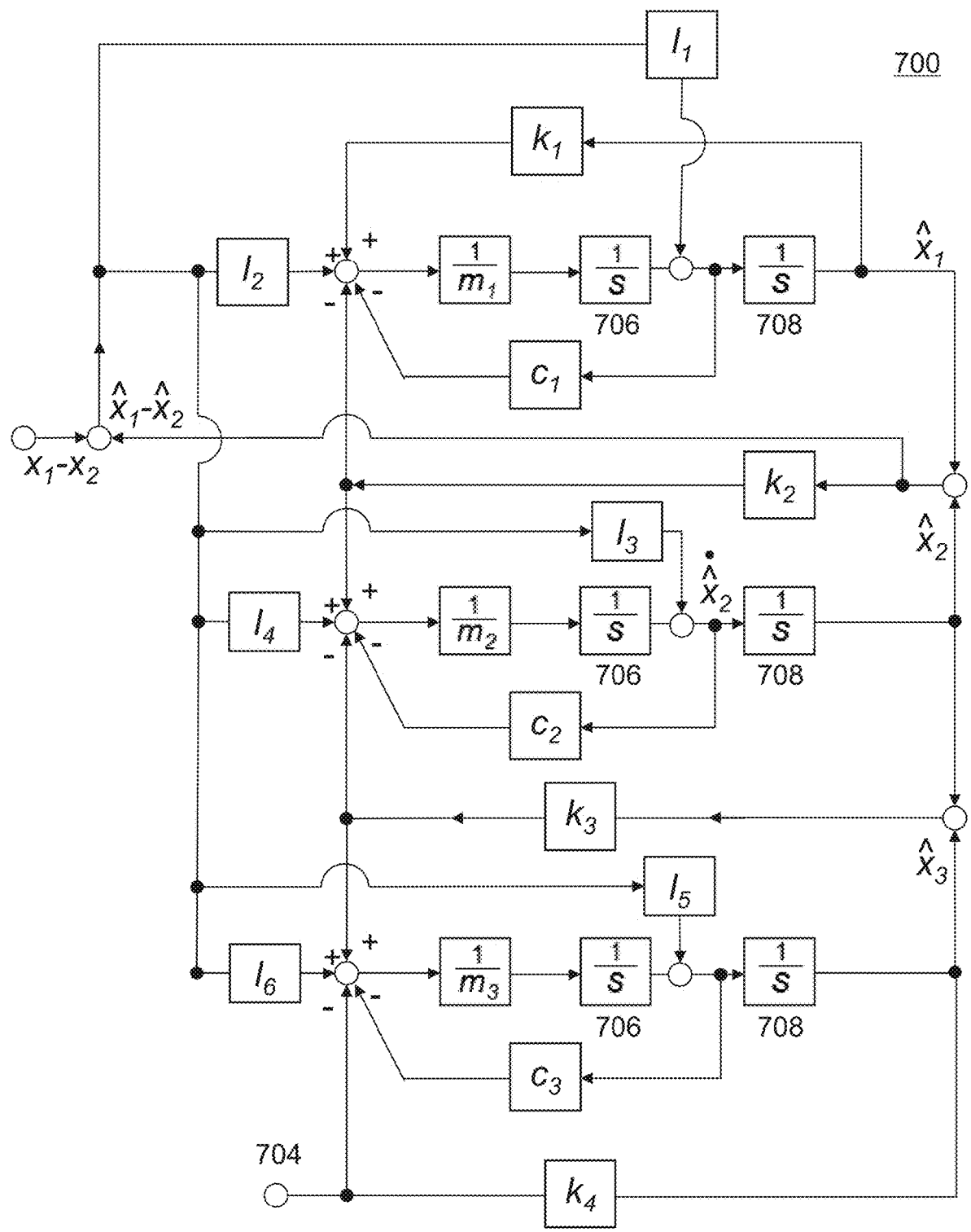
FIG. 7 is a schematic diagram of an observer, according to one or more embodiments of the present disclosure.

FIG. 7 illustrates a schematic diagram for an alternative design of an observer 700. Similar to the above-discussed observer 500, this observer 700 also includes the schematic diagram 400 of the BHA model. However, observer 700 is not PID integrated. Rather, observer 700 includes a set of coefficients $I_i$ 702, which can be selected such that the estimated bit on force 704 adapts to the real bit force, in the presence of additive bit force disturbances. The coefficients can be designed by solving a group of inequality functions such that the estimation converges to the real bit force quickly. In observer 700, $m_1$, $m_2$, and $m_3$ correspond to the three masses 302, 304, and 306 of the 3-mass BHA dynamics model in FIG. 3 (e.g., $M_1$, $M_2$, and $M_3$, respectively, representing different masses of three BHA sections). Further, $k_1$, $k_2$, $k_3$, and $k_4$ correspond to the spring coefficients 308, 310, 312, and 314 of the 3-mass BHA dynamics model in FIG. 3, $c_1$, $c_2$, and $c_3$ correspond to the damping coefficients 316, 318, and 320 of the 3-mass BHA dynamics model in FIG. 3. In the schematic diagram, two integrator blocks (e.g., 1/s) 706 and 808 are included next to each of the mass accelerations, $1/m_1$, $1/m_2$, and $1/m_3$ (e.g., according to the relationship where Force=Mass*Acceleration, and rearranged, Acceleration=Force/Mass). For each mass acceleration, a first integrator 706 integrates the mass acceleration to give its velocity, and the second integrator 708 integrates again (e.g., the output from the first integrator/velocity) to give the displacement of the respective mass.

Figure 8:
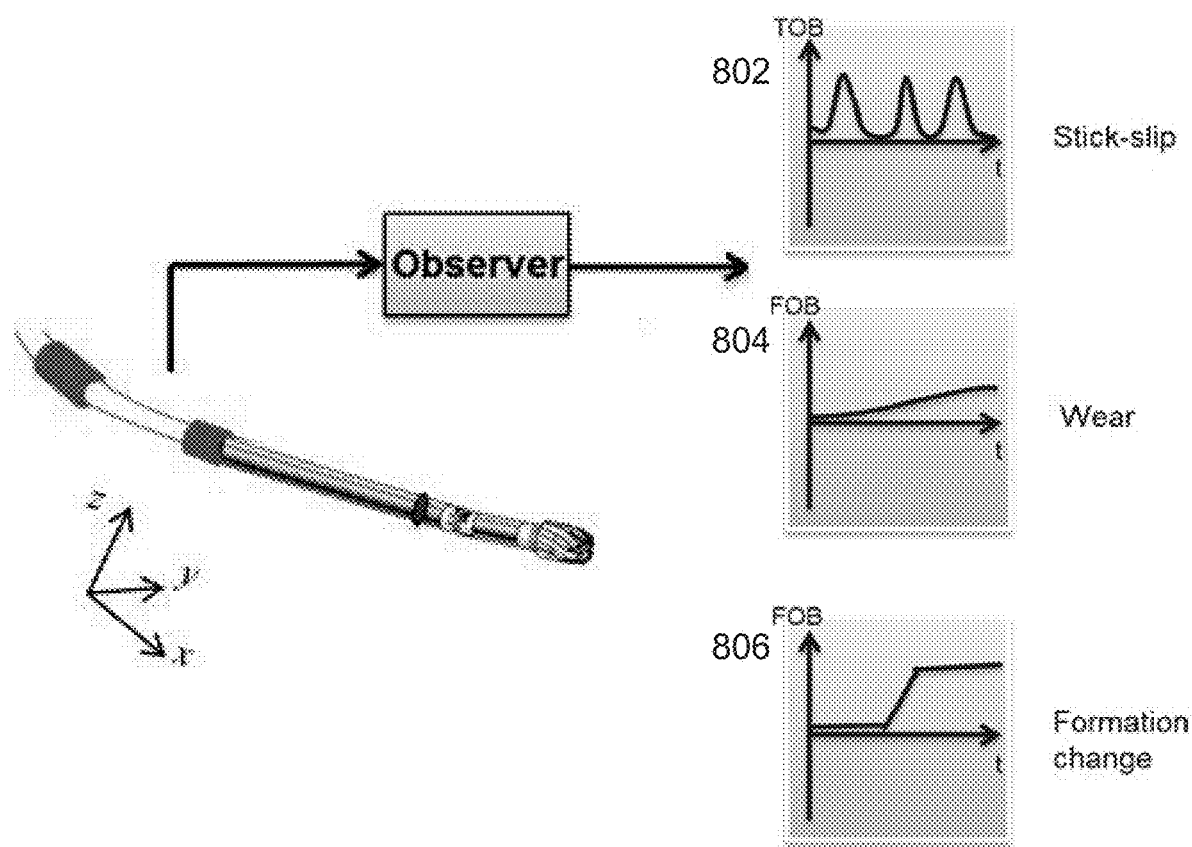
FIG. 8 is a diagram providing illustrations of drilling diagnoses based upon estimated bit force disturbances from an observer, according to one or more embodiments of the present disclosure.

Bit force disturbances are related to rock mechanics, damaging bit vibrations, and the bit wear, and thus, estimated bit force disturbances can be used to sense the rock type, stick-slip and modify the bit wear model. For example, FIG. 8 is a diagram providing illustrations of how estimated bit force disturbances from an observer facilitate drilling diagnoses. A rate of change of the bit force disturbance (e.g., as estimated from the PID output 510 in the first observer 500) is expected to be correlated to a system change. By observing the rate of change of the bit force disturbance from the observer, various events/faults can be diagnosed. For example, if the disturbance change rate is fast and mostly contained within the rotational observer, it is indicative of stick-slip vibrations 802. If the disturbance change rate changes slowly and relates to historically applied force vectors on a particular axis, it is indicative of wear phenomena 804. If the disturbance change rate changes quickly on the X, Y, or Z axes and is aligned with a planer feedback across the coordinate frame, it is indicative of changing rock types/formation changes 806.

Figure 9:
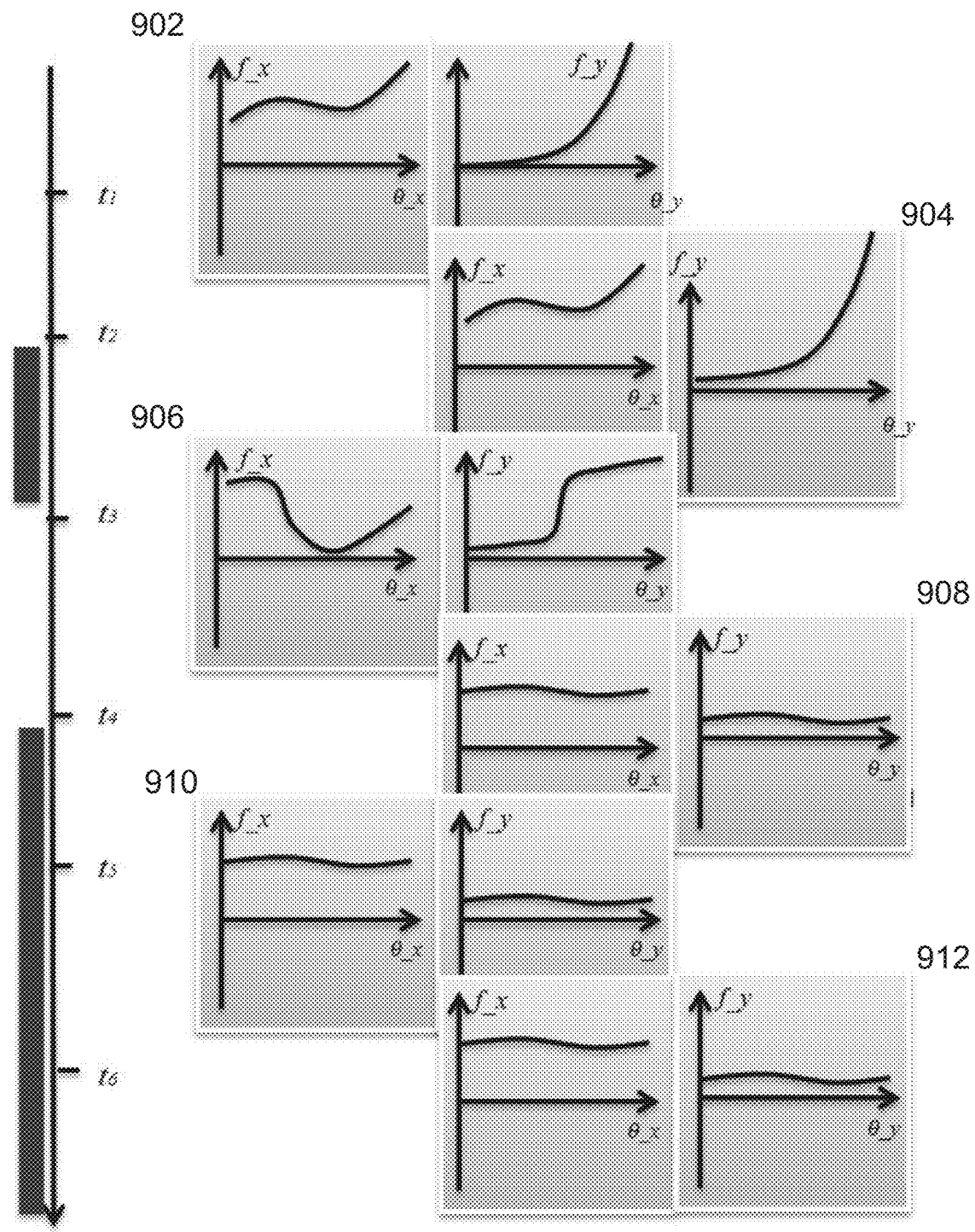
FIG. 9 is a diagram that illustrates fault detection based on bit force observations, according to one or more embodiments of the present disclosure.

Further, during drill path steering, bit force direction indicates a steering direction. Estimation of the bit force enables real-time inspection of rock mechanics and control for drilling along a path with reduced tortuosity. For example, FIG. 9 is a diagram of fault detection based on bit force observations. The reactive bit force can be inspected by perturbing the bending of a BHA, for example, the BHA 104 of FIG. 1. The perturbation is performed, for example, using a rotary steerable system (RSS), with various bending angles along the X and/or Y axis directions, and the resulting bit reactive forces being estimated from the observers discussed herein. The relationship between the various bending angles and estimated bit forces thus can be characterized to provide an indication of the mechanical properties of rocks and formations encountered downhole. This relationship indicates how "hard" the rock is along different directions. Higher bit reactive forces correspond to "harder" rocks in the X and/or Y axis directions.

When drilling proceeds in a first formation, the relationship curves of the estimated bit reactive forces for various bending angles (in both the X and Y axis directions) retain approximately a similar shape (e.g., curves 902 and 904 representing relationship curves during drilling at times $t_1$ and $t_2$, respectively). A change in the shape of relationship curves of the estimated bit reactive forces for various bending angles can indicate a change in formation experienced downhole at the bit, for example, due to the different mechanical properties of rocks encountered. For example, between curves 904 and 906 (e.g., representing relationship curves during drilling at times $t_2$ and $t_3$, respectively), a change in the shape of the relationship curves (in both the X and Y axis directions) indicates the presence of a formation change. Although the shapes of both relationship curves in the X and Y axis directions change between times $t_2$ and $t_3$ in this example, it is not necessary for both relationship curves to change to be indicative of a formation change. In some instances, the shape of either one of the relationship curves for the X or Y axis directions can indicate a change in formation if the new formation only changes mechanical properties in only one of the X or Y axis directions.

It is noted that the shapes of the relationship curves are often highly nonlinear (e.g., curves 902-906 at times $t_1$, $t_2$, and $t_3$, respectively). A sudden change from highly nonlinear relationship curves to almost flat relationship curves indicates bit balling (e.g., see curves 908-912 from time $t_4$ and after). Observing the relationship curves not only provides the rock mechanics inspection but also provides a basis to the real-time control. Based on the real-time, bit force-bending angle relationship, drilling can be maneuvered back to a designed trajectory through an easier to drill path with reduced tortuosity, energy consumption, and bit wear.

FIG. 10 illustrates a flowchart of a method 1000 for operating an estimated system to estimate bit forces in drilling operations, according to one or more embodiments. As will be appreciated by those skilled in the art, several variances to the method 1000 may occur without departing from the scope of the disclosure. For example, there are several ways to increase or reduce the number of operations in the method 1000 depending upon the desired bit force estimations. For example, an operator may choose to only estimate one of either a force on bit or a bit force disturbance experienced at a drill bit for modeling drilling dynamics and identifying drilling events.

In operation 1002, a first drilling measurement is taken at a first depth within a borehole. The first drilling measurement includes acquiring a measured strain experienced at the first depth with a sensor sub provided on a bottom-hole assembly. In at least one embodiment, the sensor sub also acquires real-time measurements of torque, tension, torsion, bending, and/or vibration at a drill collar of the bottom-hole assembly. The strain and torque measurements from the sensor sub are used to estimate the bit force and torque experienced at a drill bit positioned at an end of the bottom-hole assembly.

In operation 1004, an estimated strain experienced at the first depth is calculated with an observer. The observer design described herein decomposes the dynamics of the bottom-hole assembly into the X, Y, and Z directions, as well as including a torsional direction. In each direction of the X, Y, and Z axes, the BHA dynamics is modeled using a 3-mass BHA model. In the BHA dynamics model 300 of FIG. 3, $k_4x_3$ corresponds to the real bit force/force on bit and $x_1-x_2$ corresponds to the strain as measured by, for example, the sensor sub. The measured strain correlates to a real force on bit, and therefore, the measured strain is provided as input to the observer to calculate an estimated strain experienced at the first depth.

In operation 1006, the observer converges the estimated strain towards the measured strain. In one embodiment, the observer includes a proportional-integral-derivative (PID) controller. Both the estimated strain and the measured strain are provided as inputs to the PID controller to minimize a difference between the measured and estimated strains. The PID controller outputs a force to the estimated system by determining an error, a difference, between estimated strain (e.g., $\hat{x}_1-\hat{x}_2$ as estimated by the observer) relative to the measured strain (e.g., $x_1-x_2$). The PID controller uses the error, the integration of the error, and the rate of change of the error with an appropriate gain for updating the estimated system's dynamics and converging the estimated strain towards the measured strain. The PID controller outputs the force so that a difference (e.g., the error) between the measured strain (e.g., $x_1-x_2$ as measured by the sensor sub) and the estimated strain ($\hat{x}_1-\hat{x}_2$ as estimated from the model of the estimated system), is determined to zero as closely and soon as possible. In another embodiment, the observer converges the estimated strain to the measured strain by using a set of coefficients $I_i$ (e.g., selected by solving a group of inequality functions), such that the bit force estimation adapts to the real bit force, in the presence of additive bit force disturbances.

In operation 1008, a bit force experienced at the first depth is estimated based on the estimated strain after the estimated strain converges towards the measured strain. Once the error is determined towards zero, the estimated system dynamics output approximates the real system's dynamics as measured. Thus, an estimated force on bit can replicate the real force on bit experienced downhole.

The method 1000 may further include an optional operation 1010, as indicated by the dashed lines, wherein a bit force disturbance is estimated based at least in part on an output from the PID controller of the observer. An output of the PID controller is indicative of a bit force disturbance. In the presence of bit force disturbances, the output of the PID controller approaches a value of bit force disturbance to reduce the difference between the real and estimated strains (e.g., inputs into the PID controller). Thus, the output of the PID controller approximates and can be used to estimate the bit force disturbance, which represents an additive force/torque disturbance experienced at drill bit of the bottom-hole assembly. Further, measuring a rate of change of the bit force disturbances facilitates diagnoses of drilling operation events.

In one example, drilling operation events can be detected by estimating the bit force experienced at a first depth for a plurality of bottom-hole assembly bending angles. After drilling an interval from the first depth to a second depth, the bit force experienced at the second depth for the plurality of bottom-hole assembly bending angles is estimated. Drilling, operation events are detected based at least in part on differences between the bit forces experienced at the first and second depths.

The systems and methods described herein of using sensor sub measurements in bit force observers can accurately estimate a real-time bit force, as well as determine a bit force disturbance, experienced at a drill bit. Real-time bit force estimation enables drilling dynamics modeling including, for example, formation modeling and bit wear modeling. Further, real-time data regarding the bit forces and disturbances can indicate the occurrence of negative drilling events, such as damaging hit vibrations, bit force disturbances, bit wear, and/or rock mechanics changes, which can be quickly responded to for more effective downhole steering control.

In some embodiments, the present disclosure may be embodied as a set of instructions on a computer readable medium comprising ROM, RAM, CD, DVD, hard drive, flash memory device, or any other non-volatile, machine-readable storage devices, now known or unknown, that when executed causes one or more processing units of a computerized system (such as processing unit 134 of FIG. 1) to implement a method of the present disclosure, for example the method described in FIG. 10.

In some examples, the processing unit 134 (which may be a conventional "computer" (in any of a variety of known forms)) provides a suitable user interface and can provide and control storage and retrieval of data. In many examples, the processing unit 134 will include one or more processors in combination with additional hardware as needed (volatile and/or non-volatile memory; communication ports; I/O device(s) and ports; etc.) to provide the control functionality as described herein. An example processing unit 134 can serve to control the functions of the drilling system and to receive and process downhole measurements from the sensor subs to estimate bit forces and control drilling parameters. In such examples, one or more a non-volatile, machine-readable storage devices i.e., a memory device (such as DRAM, FLASH, SRAM, or any other form of storage device; which in all cases shall be considered a non-transitory storage medium), a hard drive, or other mechanical, electronic, magnetic, or optical storage mechanism, etc.) will contain instructions suitable to cause the processor to describe the desired functionality, such as the various examples discussed herein). Of course, these functions may be implemented by separate processing units, as desired, and additional functions may be performed by such one or more processing units in response to similarly stored instructions.

Though described serially in the examples of FIG. 10, one of ordinary skill in the art would recognize that other examples may reorder the operations, omit one or more operations, and/or execute two or more operations in parallel using multiple processors or a single processor organized as two or more virtual machines or sub-processors. Moreover, still other examples can implement the operations as one or more specific interconnected hardware or integrated circuit modules with related control and data signals communicated between and through the modules. Thus, any process flow is applicable to software, firmware, hardware, and hybrid implementations.

As described in the present disclosure, estimating of bit forces can be provided using a system comprising a bottom-hole assembly coupled to a drill string that extends into a borehole. A sensor sub is arranged on the bottom-hole assembly and configured to acquire a measured strain experienced at a first depth within the borehole. An observer is communicably coupled to the sensor sub. In one example, the observer is based at least in part on a 3-mass BHA dynamics model. The observer is configured to calculate an estimated strain experienced at the first depth, converge the estimated strain towards the measured strain, and estimate a bit force experienced at the first depth based on the estimated strain.

The observer can include a proportional-integral-derivative (PID) controller, with the measured strain and estimated strain provided as inputs to the PID controller to minimize a difference between the measured and estimated strains. In one example, the observer is configured to determine an error between the measured and estimated strains towards zero. An output of the PID controller is indicative of a bit force disturbance. Further, a rate of change of the bit force disturbance can be observed to diagnose drilling operation events.

Downhole steering using feedback from one or more sensors can be provided using a control system comprising one or more sensors adapted to acquire a measured strain experienced at a first depth within a borehole. An observer is adapted to estimate a state of a model relating to at least one bit force experienced at a drill bit positioned within the borehole using measurements from the one or more sensors. The observer calculates an estimated strain experienced at the first depth, converges the estimated strain towards the measured strain, and estimates a bit force experienced at the first depth based on the estimated strain. The control system includes a feedback control algorithm adapted to set at least one downhole drilling parameter based on the estimated bit force outputted by the observer.

The observer can include a proportional-integral-derivative (PID) controller, with the measured strain and estimated strain provided as inputs to the PID controller to minimize a difference between the measured and estimated strains. An output of the PID controller is indicative of a bit force disturbance. Further, a rate of change of the bit force disturbance can be observed to diagnose drilling operation events.

In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of this disclosure. Thus, the present disclosure includes a variety of combinations and/or integrations of the embodiments and examples described herein, as well as further embodiments and examples as defined within the scope of all claims based on this disclosure, as well as all legal equivalents of such claims.

In no way should the embodiments described herein be read to limit, or define, the scope of the disclosure. Embodiments described herein with respect to one implementation, such as MWD/LWD, are not intended to be limiting. Embodiments of the present disclosure may be applicable to steering in horizontal, vertical, deviated, multilateral, u-tube connection, intersection, bypass (drill around a mid-depth stuck fish and back into the well below), or otherwise nonlinear wellbores in any type of subterranean formation.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for estimating bit forces in drilling operations, comprising:
    taking a first drilling measurement at a first depth within a borehole, the first drilling measurement providing a measured strain experienced at the first depth with a sensor sub provided on a bottom-hole assembly;
    calculating an estimated strain experienced at the first depth with an observer;
    converging the estimated strain towards the measured strain using the observer;
    estimating a bit force experienced at the first depth based on the estimated strain;
    drilling an interval from the first depth to a second depth;
    estimating the bit force experienced at the second depth;
    detecting a drilling operation event based at least in part on differences between the bit forces experienced at the first and second depths;
    identifying a bit force disturbance experienced between the first and second depths, where the bit force disturbance is an unexpected deviation in the estimated bit force experienced between the first and second depths;
    determining, with the observer, a rate of change of the bit force disturbance experienced between the first and second depths;
    categorizing the drilling operation event as at least one of the group consisting of bit wear, stick-slip vibration and changes of rock type based on the rate of change of the bit force disturbance experienced and a direction of the bit force disturbance experienced; and
    updating at least one drilling parameter to steer the bottom-hole assembly in response to detecting the drilling operation event when a difference between the estimated strain and the measured strain exceeds a predefined threshold.

2. The method of claim 1, wherein the observer includes a proportional-integral-derivative (PID) controller.

3. The method of claim 2, wherein the measured strain and estimated strain are provided as inputs to the PID controller to minimize a difference between the measured and estimated strains.

4. The method of claim 2, wherein an output of the PID controller is indicative of the bit force disturbance.

5. The method of claim 1, wherein the observer is based at least in part on a 3-mass BHA dynamics model.

6. The method of claim 1, wherein converging the estimated strain towards the measured strain comprises reducing a feedback loop gain to achieve a gradual convergence between the estimated and measured strains towards zero.

7. The method of claim 1, further comprising:
    estimating the bit force experienced at the first depth for a plurality of bottom-hole assembly steering biases; and
    estimating the bit force experienced at the second depth for the plurality of bottom-hole assembly steering biases.

8. The method of claim 1, further comprising perturbing the bottom-hole assembly in a radial direction with respect to the bottom-hole assembly, inspecting a reactive bit force with the observer and characterizing a hardness of rock based on the reactive bit force.

9. The method of claim 1, further comprising modifying a bit wear model based on the categorizing of the drilling operation event.

10. The method of claim 1, wherein categorizing the drilling operation event is further based on historically applied force vectors on a particular axis.

11. A system for estimating bit forces in drilling operations, comprising:
- a bottom-hole assembly coupled to a drill string that extends into a borehole;
- a sensor sub arranged on the bottom-hole assembly and configured to acquire a measured strain experienced at a first depth within the borehole; and
- an observer communicably coupled to the sensor sub and configured to calculate an estimated strain experienced at the first depth, converge the estimated strain towards the measured strain, estimate a bit force experienced at the first depth based on the estimated strain, estimate the bit force experienced at a second depth; detect a drilling operation event based at least in part on differences between the bit forces experienced at the first and second depths, determining a rate of change of a bit force disturbance experienced between the first and second depths with the observer, wherein the bit force disturbance is an unexpected deviation in the estimated bit force experienced between the first and second depths, categorizing the drilling operation event as at least one of the group consisting of bit wear, stick-slip vibration and changes of rock type based on the rate of change of the bit force disturbance experienced, and update at least one drilling parameter to steer the bottom-hole assembly in response to detecting the drilling operation event when a difference between the estimated strain and the measured strain exceeds a predefined threshold.

12. The system of claim 11, wherein the observer includes a PID controller.

13. The system of claim 12, wherein the measured strain and estimated strain are provided as inputs to the PID controller to minimize a difference between the measured and estimated strains.

14. The system of claim 12, wherein an output of the PID controller is indicative of the bit force disturbance.

15. The system of claim 11, wherein the observer is based at least in part on a 3-mass BHA dynamics model.

16. The system of claim 11, wherein the observer is further configured to determine an error between the estimated strain and the measured strain towards zero.

17. A control system for downhole steering using feedback from one or more sensors, the control system comprising:
- one or more sensors adapted to acquire a measured strain experienced at a first depth within a borehole;
- an observer adapted to estimate a state of a model relating to at least one bit force experienced at a drill bit positioned within the borehole using measurements from the one or more sensors, wherein the observer calculates an estimated strain experienced at the first depth, converges the estimated strain towards the measured strain, estimates a bit force experienced at the first depth based on the estimated strain, estimate the bit force experienced at a second depth, detect a drilling operation event based at least in part on differences between the bit forces experienced at the first and second depths, determines a rate of change of a bit force disturbance experienced between the first and second depths with the observer, wherein the bit force disturbance is an unexpected deviation in the estimated bit force experienced between the first and second depths, categorizes the drilling operation event as at least one of the group consisting of bit wear, stick-slip vibration and changes of rock type based on the rate of change of the bit force disturbance experienced and a direction of the bit force disturbance experienced; and
- a feedback control algorithm adapted to set at least one downhole drilling parameter steer the bottom-hole assembly based on the drilling operation event detected.

18. The control system of claim 17, wherein the observer includes a PID controller.

19. The control system of claim 18, wherein the measured strain and estimated strain are provided as inputs to the PID controller to minimize a difference between the measured and estimated strains.

20. The control system of claim 18, wherein an output of the PID controller is indicative of the bit force disturbance.

* * * * *

UNITED STATES PATENT AND TRADEMARK OFFICE
CERTIFICATE OF CORRECTION

Page 1 of 1

PATENT NO. : 10,858,927 B2
APPLICATION NO. : 15/107333
DATED : December 8, 2020
INVENTOR(S) : Jason D. Dykstra and Yuzhen Xue It is certified that error appears in the above-identified patent and that said Letters Patent is hereby corrected as shown below:

In the Specification

Column 1, Line 15, change "hit" to -- bit --

Column 3, Line 27, change "some" to -- same --

Column 4, Line 28, change "PG" to -- FIG --

Column 13, Line 62, change "hit" to -- bit --

In the Claims

Column 18, Line 31, Claim 17 change "parameter steer" to -- parameter to steer --

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*